United States Patent [19]
Haney

[11] Patent Number: 5,806,807
[45] Date of Patent: Sep. 15, 1998

[54] AIRFOIL VORTEX ATTENUATION APPARATUS AND METHOD

[76] Inventor: William R. Haney, 6507 Foxboro Dr., Mayfield Village, Ohio 44143

[21] Appl. No.: 724,971

[22] Filed: Oct. 3, 1996

Related U.S. Application Data

[ ] Provisional application No. 60/004,783 Oct. 4, 1995.

[51] Int. Cl.[6] ................................................. B64C 21/02
[52] U.S. Cl. ............................ 244/199; 244/91; 244/130
[58] Field of Search ..................................... 244/198, 199, 244/204, 130, 123, 91

[56] References Cited

U.S. PATENT DOCUMENTS

| | | | |
|---|---|---|---|
| 2,163,655 | 6/1939 | Zimmerman | 244/199 |
| 4,017,041 | 4/1977 | Nelson | 244/91 |
| 4,477,042 | 10/1984 | Griswold, II | 244/199 |
| 4,478,380 | 10/1984 | Frakes | 244/199 |

FOREIGN PATENT DOCUMENTS

| | | | |
|---|---|---|---|
| 135108 | 4/1952 | Sweden | 244/91 |
| 470287 | 5/1969 | Switzerland | 244/199 |
| 460636 | 2/1937 | United Kingdom | 244/91 |
| 1436097 | 5/1976 | United Kingdom | 244/199 |
| 2129748 | 5/1984 | United Kingdom | 244/199 |

*Primary Examiner*—Galen L. Barefoot
*Attorney, Agent, or Firm*—Ralph E. Jocke

[57] ABSTRACT

A vortex attenuating airfoil (24) includes an outboard area (28). The outboard area includes a deflector (40) which is disposed in the inboard direction from a tip (30). An air passage (46) extends through the airfoil from an inlet (48) on a high pressure side of said airfoil to an outlet (50) on a low pressure side of the airfoil. The outlet (50) is positioned in the outboard area between said deflector and the tip. In operation, air passes through the air passage to attenuate the naturally occurring vortex adjacent to the tip of the airfoil thereby reducing drag.

17 Claims, 4 Drawing Sheets

AIRFOIL VORTEX ATTENUATION APPARATUS AND METHOD

CROSS REFERENCE TO RELATED APPLICATIONS

This Application claims the benefit of U.S. Provisional application Ser. No. 60/004,783 filed on Oct. 4, 1995.

1. Technical Field

This invention relates to airfoils used in aircraft and in turbo machinery. Specifically, this invention relates to an airfoil which attenuates vortices which naturally tend to occur at the outboard tip of an airfoil.

2. Background Art

Airfoils are well known in the prior art. Aircraft wings, propellers, and rotors are well known examples of airfoils. An aircraft wing achieves lift by causing the air that flows above it to travel at a higher rate of speed than the air passing underneath it. In accordance with Bernoulli's Principle, the air traveling at a higher rate of speed above the wing is at a lower pressure than the air under the wing. The result is an upwardly directed lifting force.

Due to the higher pressure under the wing, air vortices tend to form at the outboard tip. The formation of vortices is explained with reference to FIG. 1. This Figure shows a back view of a wing or other airfoil 10. As air flows past the wing, air is caused to move at a higher velocity over the top. This creates an area of relatively higher pressure 12 below the wing and an area of relatively lower pressure 14 above the wing. At the outboard tip 16, air tends to spill over the tip from the higher pressure area to the lower pressure area. As this occurs, the air tends to move in a rotational direction as indicated by Arrow V. This rotational movement of the air causes a vortex to form. These vortices extend a distance behind the moving airfoil.

The vortices that occur at the tips of airfoils have several drawbacks. First, the vortices consume energy that could otherwise be used to move the aircraft. As a result, the vortex increases drag. This drag is significant because the tangential velocity of a vortex on a wing may be as high as 70 percent of the free stream velocity of the air passing over the wing. This high velocity in the vortex consumes considerable energy.

A further drawback associated with wing tip vortices in aircraft is that the vortices extend behind the plane a considerable distance. These vortices may pose hazards for following aircraft. This may result in the need to space aircraft greater distances, particularly during take-offs and landings.

Prior efforts have been made to attenuate the effect of airfoil tip vortices. U.S. Pat. No. 3,411,738 discloses an airfoil with outboard extensions designed to minimize the spillage of air over the wings. This design, which has "gull wing" type extensions that extend downwardly and outwardly from the ends of the wing, hold more of the air under the wing and attempts to direct the vortex downwardly away from the aircraft.

I previously developed a vortex generator for an airfoil which is shown in U.S. Pat. No. 3,596,854. This vortex generator operates to concentrate the vortex at the outboard tip of an airfoil and thereby minimize the scope of its deleterious effects.

My more recent U.S. Pat. No. 5,297,764 represents an advance over prior designs for minimizing airfoil tip vortices. In this design, the air flow is selectively turned by foil extensions and/or a swirler to attenuate the vortices. This design has the added advantage that the degree of vortex attenuation may be selectively controlled.

While my prior designs perform satisfactorily, in many airfoil applications there remains a need to provide alternative ways of attenuating vortices. Particularly there is a need for an apparatus and method for attenuating vortices that may be used in conjunction with more types of airfoils and is lower in cost to implement. Further, there is a need for an apparatus and method for attenuating vortices at the outboard tip of an airfoil that may be used in conjunction with other apparatus used for this purpose so as to provide effective vortex attenuation throughout a broader range of operating conditions.

DISCLOSURE OF INVENTION

It is an object of the present invention to provide an airfoil with tip vortex attenuation.

It is a further object of the present invention to provide an airfoil that has reduced drag.

It is a further object of the present invention to provide an airfoil that achieves greater lift and reduces fuel consumption when used in conjunction with a wing of an aircraft.

It is a further object of the present invention to provide an airfoil that has controlled air movement therethrough to reduce the strength of a wing tip vortex.

It is a further object of the present invention to provide an airfoil with selectively variable drag.

It is a further object of the present invention to provide an airfoil with selectively variable drag that may be used in an aircraft attitude or directional control system.

It is a further object of the present invention to provide a method for attenuation of vortices at the tips of airfoils.

It is a further object of the present invention to provide a method for reducing drag on an airfoil.

It is a further object of the present invention to provide a method for selectively controlling the amount of drag on an airfoil.

Further objects of the present invention will be made apparent in the following Best Modes for Carrying out Invention and the appended claims.

The foregoing objects are accomplished in the preferred embodiment of the invention by an airfoil providing vortex attenuation. The airfoil has a relatively high pressure side and a relatively low pressure side. The airfoil also has a leading edge and a trailing edge extending generally transverse to the direction of air flow past the airfoil.

The airfoil includes an outboard area which terminates in a tip. The outboard area includes a deflector which extends outward and into the low pressure area, which is generally above the upper surface of a wing. The deflector extends generally in the direction of air flow over the wing. The deflector terminates a distance from the trailing edge. The deflector is also disposed inboard from the tip of the wing.

An air passage extends through the airfoil in the outboard area. The air passage extends from an inlet which is on the high pressure side, which is generally the lower surface of an aircraft wing. The air passage extends through the wing to an outlet on the low pressure side which is on the upper surface of a wing. The outlet is positioned between the deflector and the tip of the wing. In the preferred form of the invention, the air passage is angled so as to facilitate the air flow therethrough as the foil moves relative to the air.

In operation, the air on the high pressure side of the airfoil moves relative to the airfoil in a direction opposite to the direction of movement of the airfoil. The air also moves in the outward direction toward the tip of the airfoil. This is because the air on the high pressure side spills over the tip of the airfoil to the low pressure area. However, as this outward moving air reaches the outboard area of the airfoil some of the air travels through the air passage in the wing. The air passing through the air passage exits from the outlet. The air passing from the outlet is directed opposite to the direction of air flow caused by the naturally occurring wing tip vortex. As a result, the vortex is attenuated.

The deflector which is positioned on the upper surface of the wing and inboard of the outlet from the air passage resists the flow of air inward. The deflector further prevents the induced vortices from overwhelming the air passing through the air passage so as to maintain its effectiveness.

In alternative embodiments of the invention, the flow of air through the air passage may be selectively controlled. This enables the selective attenuation of the vortex by a pilot or other operator. This enables control of the amount of drag on the airfoil. When used in an aircraft, the amount of drag on the airfoil may be selectively varied. This enables the invention to be used for controlling the attitude and direction of the aircraft as well as for reducing drag.

BEST MODES FOR CARRYING OUT INVENTION

Figure 2:
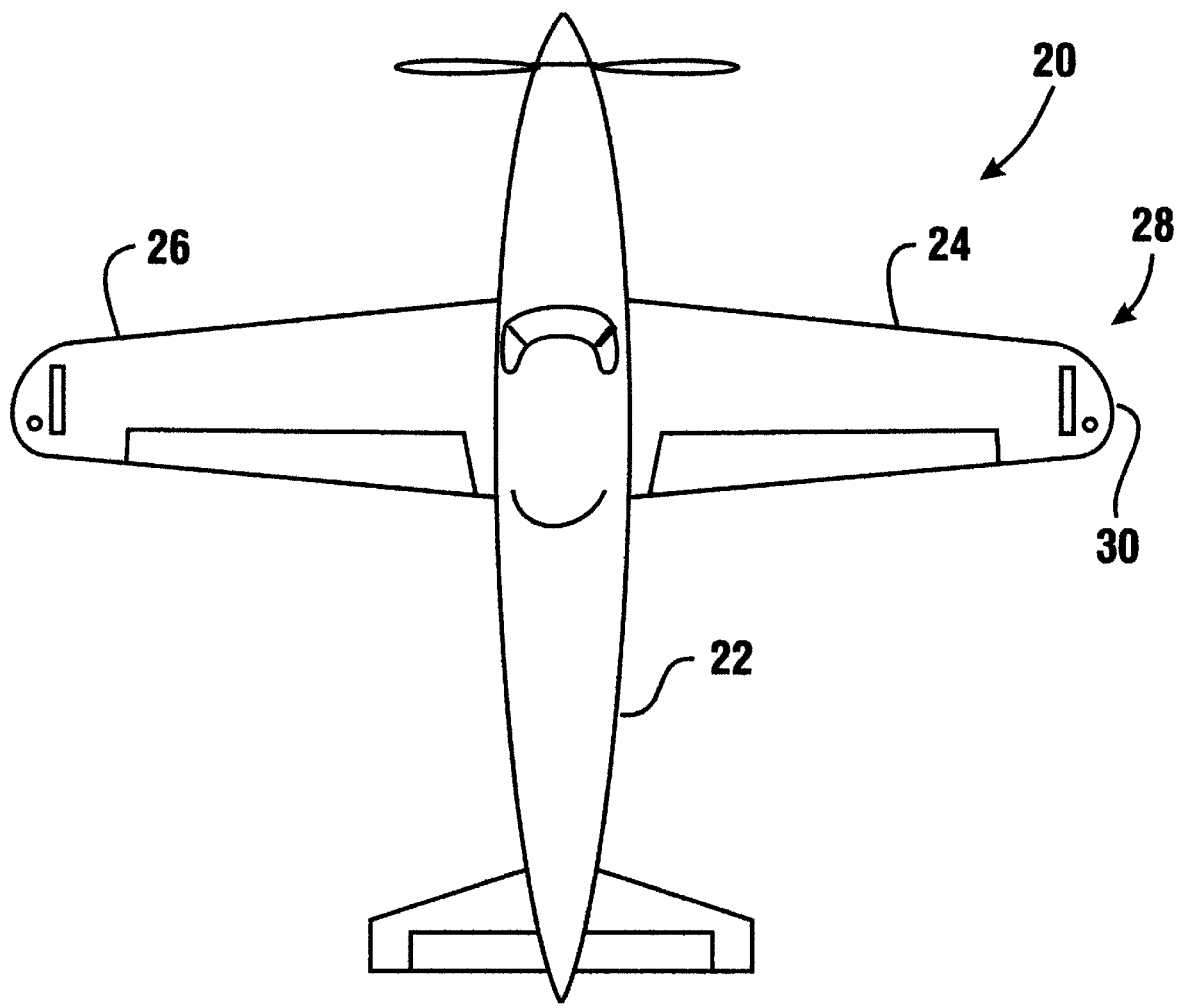
FIG. 2 is a plan view of an aircraft that includes the vortex attenuation apparatus of the present invention.

Referring now to the drawings and particularly to FIG. 2, there is shown therein an aircraft generally indicated 20. The aircraft has a fuselage 22 and primary airfoils which are wings 24 and 26. Wings 24 and 26 incorporate the vortex attenuation features of the present invention.

Wings 24 and 26 are identical except that they are mirror images of one another. Therefore only wing 24 is described herein in detail.

Wing 24 includes an outboard area generally indicated 28. Outboard area 28 terminates in a wing tip 30. The wing tip is the most outboard position of the airfoil. Although in the embodiment shown in FIG. 2, the wing tip is a simple rounded tip, it is understood that the wing tip may be of other configurations. Specifically, the wing tip may include other vortex attenuating structures including the structure shown in U.S. Pat. No. 5,297,764.

Figure 1:
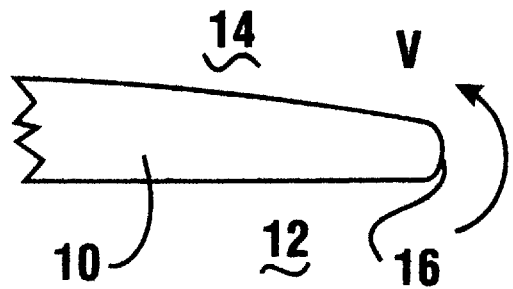
FIG. 1 is a rear view of a conventional prior art airfoil.
Figure 4:
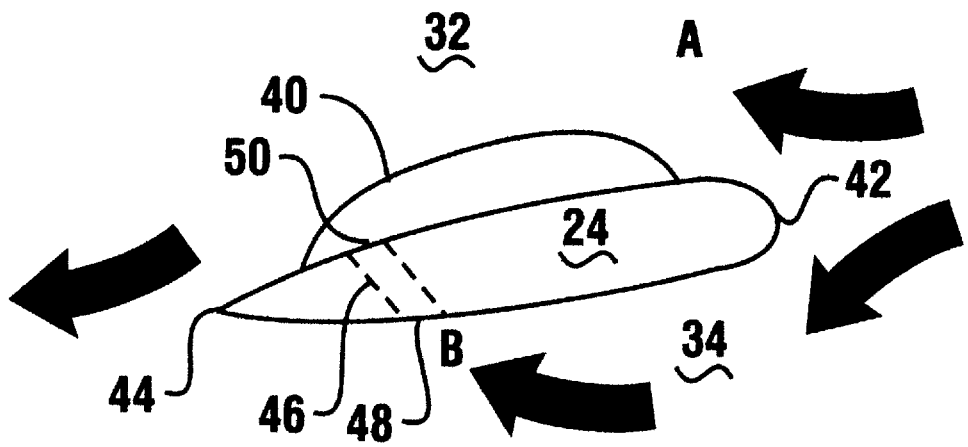
FIG. 4 is a side view of the airfoil shown in FIG. 3.
Figure 5:
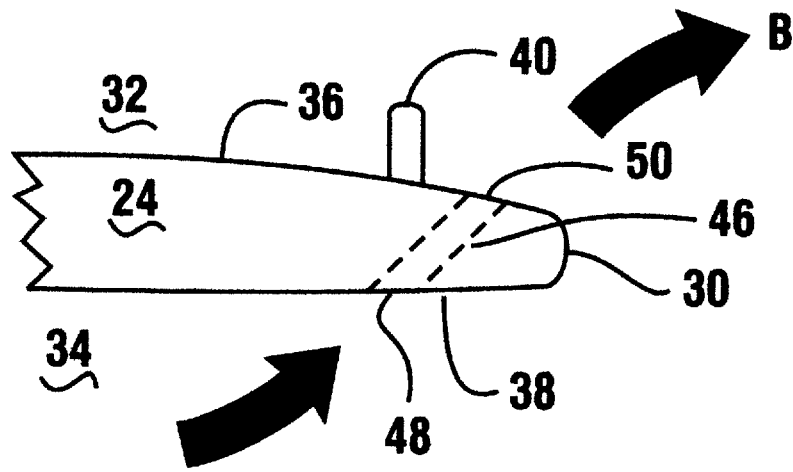
FIG. 5 is a back view of the airfoil shown in FIG. 3.
Figure 3:
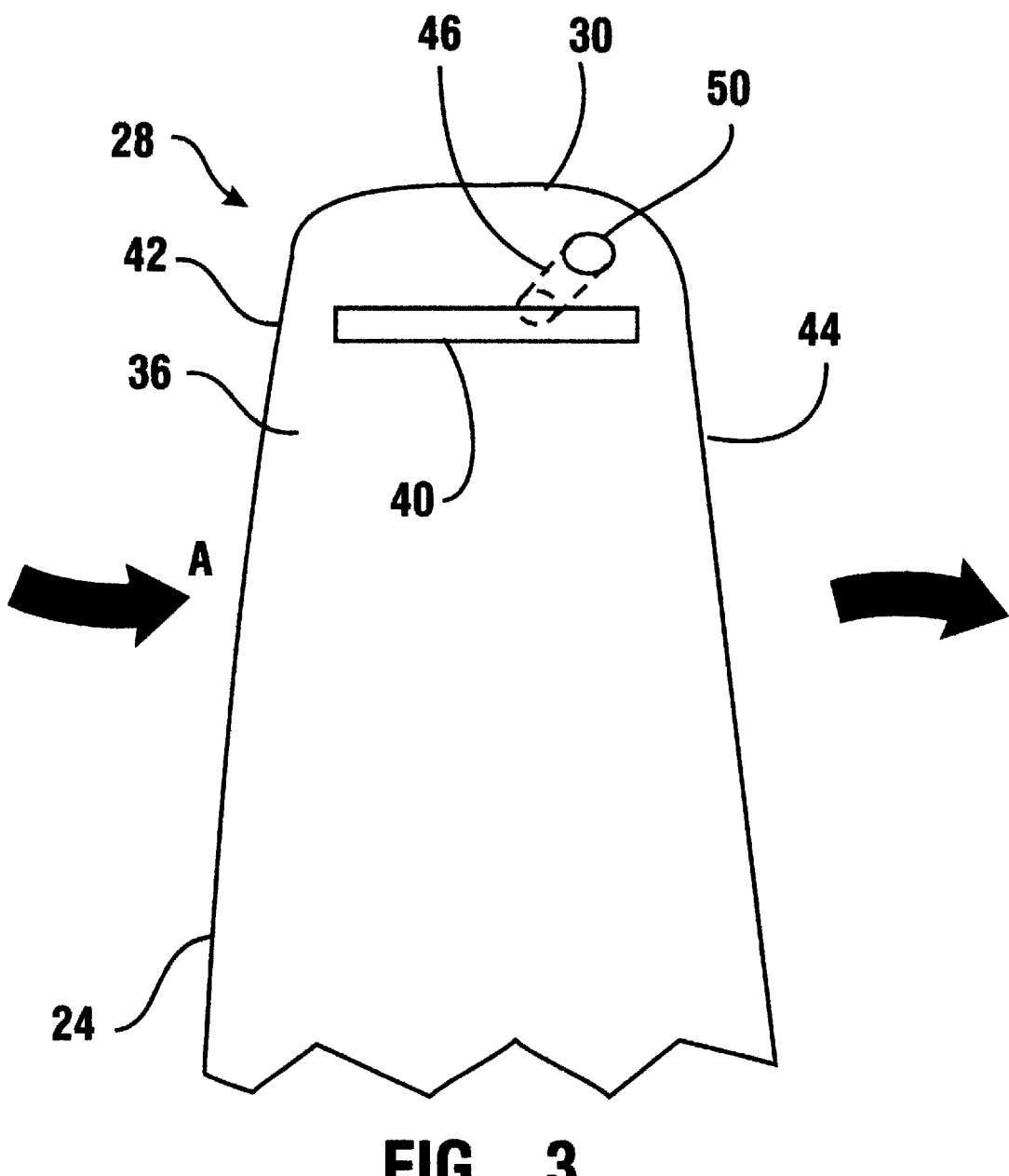
FIG. 3 is an enlarged plan view of the outboard portion of an airfoil including the vortex attenuation apparatus of the present invention.

Wing 24 is shown in greater detail in FIGS. 3, 4 and 5. The air flow over the wing (as well as through it) is indicated by air stream arrows A. As the wing 24 moves relative to the air, the velocity of the air flowing over the wing creates a low pressure area generally indicated 32 in the area above the wing. Likewise, a higher pressure area generally indicated 34 is created in the area below the wing.

The outboard area of the wing 28 includes an upper surface 36 and a lower surface 38. A deflector 40 extends upward from the upper surface of the wing. Deflector 40 extends along the upper surface of the wing generally in the direction of the air flow over the wing. Deflector 40 is disposed in an inboard direction from the tip 30. Deflector 40 also has a smooth contour so as to facilitate the air flow thereover.

Although in the embodiment shown the deflector is aligned with the forward direction of the aircraft, in other embodiments the deflectors may extend at small yaw angles. Although the yaw angle may vary depending on the airfoil type and speed, a yaw angle wherein the deflector extends further outboard with proximity to the trailing edge would commonly be desirable. In some embodiments the yaw angle may also be made variable under control of the pilot or processor control. This may be done through use of control systems similar to those used to move other control surfaces.

As best shown in FIG. 4, wing 24 has a leading edge 42 that extends transversely across the wing through the outboard area. Wing 24 also has a trailing edge 44 which likewise extends transversely across the surface of the wing and through the outboard area. The deflector 40 is positioned in the outboard area and is preferably disposed from both the leading edge and the trailing edge of the wing.

The outboard area of the wing further includes an air passage 46. Air passage 46 includes an inlet 48 that extends through the lower surface of the wing 38. Air passage 46 further includes an outlet 50 through the upper surface of the wing. Outlet 50 is positioned in the outboard area 28 of the wing in the area between the deflector 40 and the tip 30. In the preferred form of the invention, air passage 46 extends in an angle. The angle of air passage 46 is a compound angle that is directed in an angled direction toward the trailing edge from the inlet to the outlet as shown in FIG. 4. Further, the air passage is angularly directed in an outboard direction from the inlet to the outlet as shown in FIG. 5. As explained later in detail, the angular direction of the air passage facilitates the flow of air therethrough.

In operation of the airfoil or wing 24, a vortex naturally tends to form adjacent to the tip 30 of the airfoil. As viewed in FIG. 5, this vortex flows about the tip in a counter clockwise direction. This vortex is formed by the air passing from the high pressure area 34 to the low pressure area 32. The vortex attenuation apparatus of the present invention attenuates the naturally occurring vortex. This occurs because a portion of the air that moves in the outboard direction in the high pressure area enters the inlet 48 and passes through the air passage 46. This is indicated by the arrows B in FIGS. 4 and 5. Air flows through air passage 46 and exits through the outlet 50 in the outboard area of the wing. The air flow through the outlet of the air passage is directed opposite to the direction of the air flow in the naturally occurring vortex. The air flow from the air passage 46 attenuates the vortex. As a result, less energy is consumed by the vortex and drag is reduced.

Deflector 40 extends on the top surface of the wing and acts as an air dam to deter the flow of air over the top surface of the airfoil in the inboard direction. In addition, the position of the deflector 40 adjacent to outlet 50 prevents the naturally occurring vortex from overwhelming the air flow through the air passage 46. As a result, air is consistently enabled to flow through the air passage so as to provide the vortex attenuation effect. As previously discussed, in some embodiments of the invention the yaw angles of the deflectors may be varied to maintain the optimum effect for conditions and speed.

While the embodiment shown in FIGS. 1 through 5 includes a single air passage through the airfoil in the outboard area, it should be understood that in alternative embodiments multiple passages may be used. Further, although the angle of the air passage shown is both outwardly and rearwardly directed from the inlet to the outlet, in other embodiments, the air passage may extend at different simple or compound angles depending on the character of the naturally occurring vortex, the type of airfoil and the speeds involved. Further, the air passage may include features such as pressure equalization chambers and differing numbers of inlets and outlets depending on the configuration of the outboard area.

Figure 6:
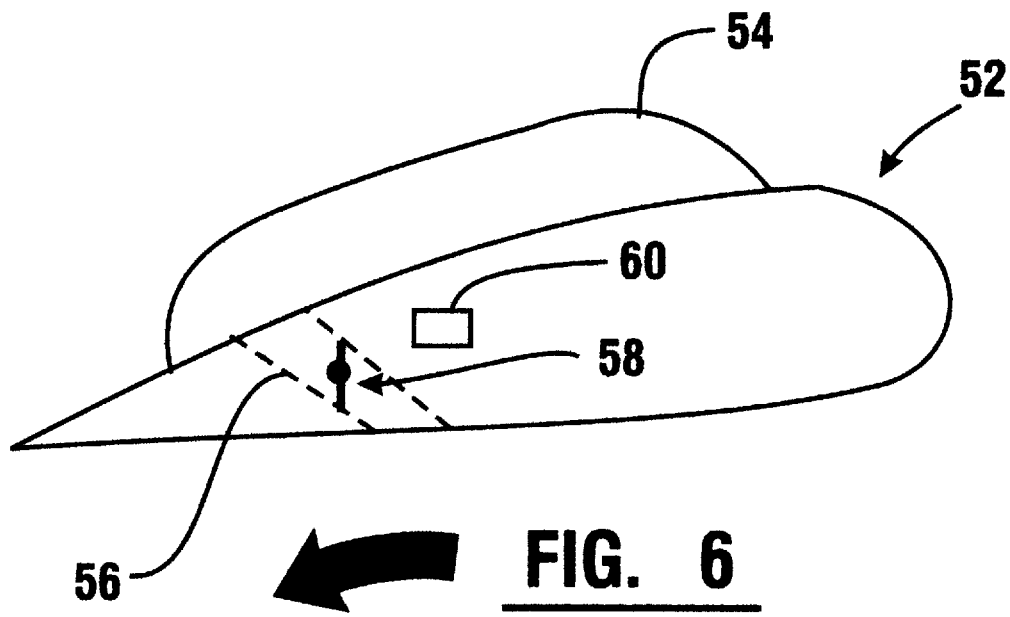
FIG. 6 is a side view of an alternative embodiment of an airfoil which includes means for selectively controlling the flow of air through the air passage in the airfoil and showing the flow control means in the closed position.
Figure 7:
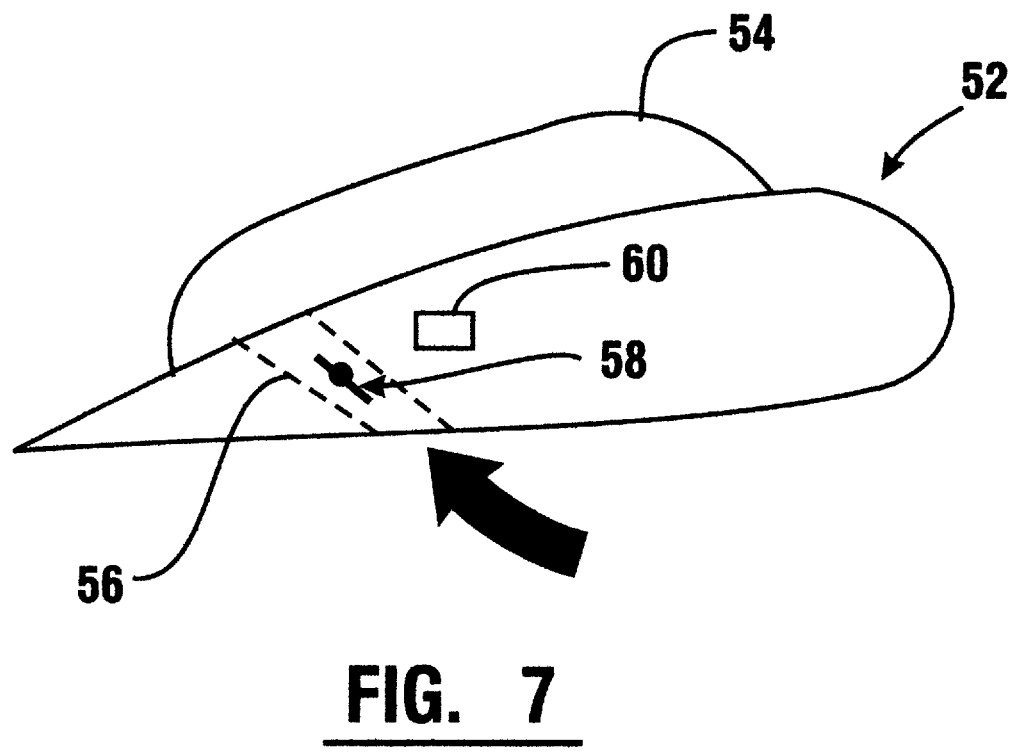
FIG. 7 is a side view of the airfoil shown in FIG. 6 with the flow control in the open position.

An alternative embodiment of the present invention is shown in FIGS. 6 and 7. A wing 52 or other airfoil is similar to wing 24 except with regard to the particular features described herein. Wing 52 includes a deflector 54 positioned on the upper surface of the wing in an outboard area and disposed from the tip thereof.

Wing 52 further includes an air passage 56 therethrough. Air passage 56 is similar to air passage 46 in the previously described embodiment except as hereinafter described. Air passage 56 includes therein a flow control schematically shown as 58. Flow control 58 is selectively controllable by an actuator 60 and moves between a closed position shown in FIG. 6 and a fully open position shown in FIG. 7. In the preferred form of the invention actuator 60 is operable under the control of an operator, such as a pilot or a programmable processor, to position the flow control 58 selectively between the open and closed positions.

In operation it may be desirable at some speeds of the airfoil to prevent flow through the air passage 56. Such conditions might arise at particularly low speeds or in some other operating conditions. In such circumstances the pilot or automated processor may control the actuator 60 so as to close the flow control 58. In this condition, virtually no air will pass through the air passage. Thereafter, when vortex attenuation is desired, the flow control 58 may be selectively moved to the open position shown in FIG. 7 or an intermediate position. In the open position, air flows through air passage 56 and attenuates the naturally occurring vortex at the tip of the wing.

A further advantage of the alternative embodiment shown in FIGS. 6 and 7 is that a pilot or automated processor based control system may selectively control the attenuation of the wing tip vortices. This enables the selective attenuation of drag on the wings of the aircraft. The pilot or automated control system may selectively vary the vortex attenuation and drag on each wing by positioning the flow controls 56 on each wing in varying positions. This enables control of the direction and attitude of the aircraft. This may be achieved by using suitable actuators that selectively and independently control the degree to which the flow controls in the air passages through the wings of the aircraft are open. Such actuators for variably positioning the flow controls may be of the hydraulic or other type known to those skilled in the prior art.

It should be understood that while the embodiment shown in FIG. 6 and 7 includes a rotatable flap-type flow control, in other embodiments of the invention other types of flow controls may be used. These may include valves such as slide valves, ball-type valves, flap-type valves or any other means for varying the area of the opening through which air may flow. Alternative embodiments may also include valves or other features adjacent to the inlet or outlet of the air passages so as to direct air into or away therefrom. Specifically for example, a flap-type valve like that shown in FIG. 6 and 7 may be positioned adjacent to the inlet in the bottom surface of the wing. Such a flap valve may be positioned so that in the open position a valve member extends outward from the lower surface of the wing. This enables the valve to direct air into the air passage in the manner of a scoop or scoop member and forcing more air through the air passage. Alternatively, a valve utilizing similar principles may be placed adjacent to the outlet of the air passage. Such a valve may be actuated to have a member move into the air stream and reduce pressure so as to draw air through the air passage. Those skilled in the art may use combinations of such valves in a single air passage so as to achieve the desired degree of air flow therethrough to attenuate the vortices.

It will be understood by those skilled in the art that the vortex attenuation device of the present invention is substantially different in its operation from winglets or similar structures that are commonly used on airfoils. Winglets are positioned generally at the tip of an airfoil and adjacent to the trailing edge. Winglets produce substantial drag on the airfoil. In addition, winglets may change the characteristics of the airfoil in ways that may not always be desired. In contrast, the deflector of the present invention is disposed in the inboard direction from the tip of the airfoil and is also disposed in a forward direction from the trailing edge. It functions to enable air flow through the air passage, and in the preferred form of the invention does not add significant drag. It should also be emphasized that the present invention may be utilized in conjunction with airfoil designs having upward extending winglets so as to reduce the drag thereon.

Further, and more desirably, the design of the present invention may be used in conjunction with the vortex attenuating airfoil shown in U.S. Pat. No. 5,297,764, the disclosure of which is incorporated herein by reference. The use of the present invention in combination with the vortex attenuation structure and method disclosed therein provides an even broader range of vortex attenuation over a range of air flows and conditions so as to achieve more effective vortex attenuation and reduce drag.

It will be understood by those skilled in the art that although the invention as shown is used in conjunction with the primary airfoils of an aircraft, the invention may be applied to other structures and surfaces. In addition, the principles of the invention may be applied to airfoils used in applications other than aircraft.

Thus, the methods and apparatus of the present invention achieve the above-stated objectives, eliminate difficulties encountered in the use of prior devices and systems, solve problems and attain the desirable results described herein.

In the foregoing description, certain terms have been used for brevity, clarity and understanding, however no unnecessary limitations are to be implied therefrom because such terms are for descriptive purposes and are intended to be broadly construed. Moreover, the descriptions and illustrations given herein are by way of examples and the invention is not limited to the exact details shown and described.

In the following claims, any feature or step described as a means for performing a function shall be construed as encompassing any means capable of performing the function and shall not be limited to the particular means shown in the foregoing description or mere equivalents.

Having described the features, discoveries and principles of the invention, the manner in which it is constructed and operated, and the advantages and useful results obtained; the new and useful structures, devices, elements, arrangements, parts, combinations, systems, equipment, operations and relationships are set forth in the appended claims.

I claim:

1. An airfoil including a tip vortex attenuation apparatus, said airfoil having a relatively high pressure side and a relatively low pressure side upon movement of said airfoil in a forward direction relative to surrounding air, said airfoil having a trailing edge relative to air flow past said airfoil, and an outboard area terminating in a tip, said vortex attenuation apparatus comprising:

a deflector, said deflector extending into said low pressure area in said outboard area of said airfoil, said deflector further extending generally in the direction of said movement, wherein said deflector is disposed from said trailing edge and in an inboard direction from said tip;

an air passage extending through said airfoil, said air passage extending from an inlet in connection with said high pressure side of said airfoil to an outlet in connection with said low pressure side, wherein said outlet is positioned intermediate of said deflector and said tip, wherein when the airfoil is moved in the forward direction air passes from the outlet and opposes air movement in the inboard direction adjacent said low pressure side, whereby vortices generated adjacent the tip are attenuated.

2. An airfoil according to claim 1, wherein said deflector is disposed from said trailing edge.

3. An airfoil according to claim 1, wherein said air passage is angled from an inlet to an outlet toward said trailing edge.

4. An airfoil according to claim 1, further comprising airflow controlling means, wherein said controlling means selectively controls the airflow through said air passage.

5. An airfoil according to claim 1, wherein said air passage is angled from an inlet to an outlet toward said outboard area.

6. An airfoil according to claim 1, wherein the yaw angle of said deflector is selectively controlled.

7. An airfoil according to claim 1, further comprising a valve, wherein said valve selectively controls the airflow through said air passage.

8. An airfoil according to claim 7, wherein said valve is positioned within said air passage.

9. An airfoil according to claim 7, wherein said valve is selectively controllable and operable under the control of an operator.

10. An airfoil according to claim 1, further comprising a scoop member, wherein said scoop member is positioned adjacent the inlet of said air passage, wherein said scoop member is operable to direct air into said inlet of said air passage.

11. An airfoil according to claim 8, wherein said valve is positioned adjacent said inlet of said air passage.

12. A method of attenuating vortices at an outboard end of an airfoil of an aircraft, comprising the steps of:

moving said airfoil of said aircraft through air in a forward direction to develop a high pressure area on a first side of said airfoil and a low pressure area on an opposed side of said airfoil and vortex air movement about an outboard end of said airfoil as air moves from said high pressure area to said low pressure area;

passing air from said high pressure area to said low pressure area through an air passage positioned through said outboard end of said airfoil, wherein air passes out of the air passage through an outlet wherein the outlet is in an inboard direction relative to the outboard end of the airfoil;

deflecting said airflow about said outboard end with a deflector positioned on said opposed side of said airfoil and wherein the outlet is positioned intermediate of the deflector and the outboard end, and wherein the air passing from the outlet opposes air movement in the inboard direction adjacent the opposed side of the airfoil, whereby vortices generated adjacent the air foil end are attenuated.

13. The method according to claim 12 further comprising the step of varying the amount of airflow passing through said air passage, wherein vortex attenuation and drag on the airfoil are correspondingly varied.

14. The method according to claim 12 further comprising the step of scooping air into an inlet of said air passage.

15. The method according to claim 12 further comprising the step of varying the yaw of said deflector.

16. The method according to claim 13, wherein airflow varying means is positioned within said air passage, further comprising the step of selectively controlling said airflow varying means, wherein vortex attenuation and drag on the airfoil are correspondingly varied, and whereby the aircraft is selectively controlled.

17. A method of attenuating tip vortices adjacent an outboard tip of an airfoil, comprising the steps of:

moving the airfoil relative to surrounding air in a forward direction to develop a high pressure area on a first side of the airfoil and a low pressure area on a second opposed side of the airfoil, wherein the airfoil terminates at an outboard tip, wherein air movement from the high pressure area to the low pressure about the tip produces a tip vortex;

passing air from the high pressure first side to the low pressure second side through an air passage extending through the airfoil, wherein the air exits from the passage through an outlet positioned in an inboard direction from the tip;

deflecting air passing from the outlet of the air passage with a deflector positioned on the second side of the airfoil, wherein the deflector is positioned in the inboard direction relative to the outlet, and wherein the deflector causes air to move in an outboard direction from the outlet toward the tip, whereby the tip vortex is attenuated.

* * * * *